(12) United States Patent
Jacquin et al.

(10) Patent No.: US 10,715,332 B2
(45) Date of Patent: *Jul. 14, 2020

(54) ENCRYPTION FOR TRANSACTIONS IN A MEMORY FABRIC

(71) Applicant: HEWLETT PACKARD ENTERPRISE DEVELOPMENT LP, Houston, TX (US)

(72) Inventors: Ludovic Emmanuel Paul Noel Jacquin, Bristol (GB); Liqun Chen, Bristol (GB); Chris I. Dalton, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 154 days.

This patent is subject to a terminal disclaimer.

(21) Appl. No.: 15/515,707

(22) PCT Filed: Oct. 30, 2014

(86) PCT No.: PCT/US2014/063174
§ 371 (c)(1),
(2) Date: Mar. 30, 2017

(87) PCT Pub. No.: WO2016/068942
PCT Pub. Date: May 6, 2016

(65) Prior Publication Data
US 2017/0302454 A1    Oct. 19, 2017

(51) Int. Cl.
*G06F 12/14* (2006.01)
*H04L 9/32* (2006.01)
(Continued)

(52) U.S. Cl.
CPC .......... *H04L 9/3242* (2013.01); *G06F 21/602* (2013.01); *G06F 21/64* (2013.01);
(Continued)

(58) Field of Classification Search
USPC ........................................................ 713/193
See application file for complete search history.

(56) References Cited

U.S. PATENT DOCUMENTS 5,831,980 A    11/1998   Varma et al.
5,956,408 A     9/1999   Arnold
(Continued)

FOREIGN PATENT DOCUMENTS

CN    1679003 A       10/2005
JP    2007-074761 A    3/2007
(Continued)

OTHER PUBLICATIONS

International Search Report & Written Opinion received in PCT Application No. PCT/US2014/063174, dated Jun. 29, 2015, 9 pages.

(Continued)

*Primary Examiner* — Amare F Tabor
(74) *Attorney, Agent, or Firm* — Hewlett Packard Enterprise Patent Department

(57) ABSTRACT

In an example, memory address encryption is facilitated for transactions between electronic circuits in a memory fabric. An electronic circuit may obtain a transaction integrity key and a transaction encryption key. The electronic circuit may encrypt an address using the transaction encryption key and a compute a truncated message authentication code (MAC) using the transaction integrity key.

17 Claims, 7 Drawing Sheets

(51) Int. Cl.
*G06F 21/79* (2013.01)
*G06F 21/64* (2013.01)
*G06F 21/60* (2013.01)
*H04L 9/06* (2006.01)
*H04L 9/08* (2006.01)
*H04L 9/14* (2006.01)

(52) U.S. Cl.
CPC ............ *G06F 21/79* (2013.01); *H04L 9/0618* (2013.01); *H04L 9/0643* (2013.01); *H04L 9/083* (2013.01); *H04L 9/14* (2013.01)

(56) References Cited

U.S. PATENT DOCUMENTS

| | | | |
|---|---|---|---|
| 6,092,191 | A | 7/2000 | Shimbo et al. |
| 7,191,437 | B1 | 3/2007 | Coatney et al. |
| 7,320,008 | B1 | 1/2008 | Colgrove |
| 7,506,368 | B1 | 3/2009 | Kersey et al. |
| 7,725,603 | B1 | 5/2010 | Kanevsky et al. |
| 7,778,253 | B2 | 8/2010 | Balakrishnan et al. |
| 7,876,897 | B2 | 1/2011 | Yi |
| 8,001,054 | B1* | 8/2011 | Peart .................. G06Q 20/0855 705/64 |
| 8,130,953 | B2 | 3/2012 | Gustavsson et al. |
| 8,218,759 | B2* | 7/2012 | Moffat .................. H04L 9/0643 380/28 |
| 8,245,032 | B2* | 8/2012 | Donley .................. H04L 1/1607 713/151 |
| 8,442,526 | B1 | 5/2013 | Bertz et al. |
| 8,503,679 | B2* | 8/2013 | Bugbee .................. H04L 9/0841 380/255 |
| 8,560,849 | B2* | 10/2013 | Machani ............... H04L 9/0637 380/229 |
| 8,646,090 | B1 | 2/2014 | Gadde et al. |
| 8,726,037 | B2 | 5/2014 | Pean et al. |
| 8,726,042 | B2 | 5/2014 | Lange et al. |
| 9,087,189 | B1 | 7/2015 | Koeten et al. |
| 9,992,197 | B2* | 6/2018 | Agiwal ................. H04W 12/02 |
| 2002/0056050 | A1 | 5/2002 | Heiden et al. |
| 2003/0161064 | A1 | 8/2003 | Hori et al. |
| 2004/0049774 | A1 | 3/2004 | Boyd et al. |
| 2005/0187873 | A1 | 8/2005 | Labrou et al. |
| 2006/0045099 | A1 | 3/2006 | Chang et al. |
| 2006/0085607 | A1 | 4/2006 | Haruma |
| 2006/0264202 | A1 | 11/2006 | Hagmeier et al. |
| 2007/0067437 | A1 | 3/2007 | Sindambiwe |
| 2007/0130470 | A1 | 6/2007 | Blom et al. |
| 2007/0186279 | A1 | 8/2007 | Zimmer et al. |
| 2007/0260891 | A1 | 11/2007 | Starr et al. |
| 2008/0060055 | A1 | 3/2008 | Lau |
| 2008/0095368 | A1 | 4/2008 | Iida et al. |
| 2008/0112405 | A1 | 5/2008 | Cholas et al. |
| 2009/0073992 | A1 | 3/2009 | Makishima et al. |
| 2009/0080432 | A1 | 3/2009 | Kolakeri et al. |
| 2009/0161692 | A1 | 6/2009 | Hirata et al. |
| 2009/0254647 | A1 | 10/2009 | Elzur et al. |
| 2010/0042689 | A1 | 2/2010 | Doggett |
| 2010/0071030 | A1 | 3/2010 | Rosenan et al. |
| 2010/0232793 | A1 | 9/2010 | Atkinson |
| 2012/0131289 | A1 | 5/2012 | Taguchi et al. |
| 2012/0150742 | A1 | 6/2012 | Poon et al. |
| 2012/0150748 | A1 | 6/2012 | Law et al. |
| 2012/0185699 | A1* | 7/2012 | Arnold .................. H04L 9/0822 713/189 |
| 2012/0204032 | A1 | 8/2012 | Wilkins et al. |
| 2012/0265840 | A1 | 10/2012 | Benner et al. |
| 2012/0284524 | A1 | 11/2012 | Ho |
| 2013/0042052 | A1 | 2/2013 | Colgrove et al. |
| 2013/0080790 | A1 | 3/2013 | Pean et al. |
| 2013/0117577 | A1 | 5/2013 | Hars et al. |
| 2013/0191649 | A1 | 7/2013 | Muff et al. |
| 2013/0227201 | A1 | 8/2013 | Talagala et al. |
| 2013/0246840 | A1 | 9/2013 | Kumano et al. |
| 2013/0312082 | A1 | 11/2013 | Izu et al. |
| 2014/0021471 | A1 | 1/2014 | Pietambaram et al. |
| 2014/0075189 | A1 | 3/2014 | Abraham et al. |
| 2014/0095805 | A1 | 4/2014 | Kapil et al. |
| 2014/0095865 | A1 | 4/2014 | Yerra et al. |
| 2014/0115219 | A1 | 4/2014 | Ajanovic et al. |
| 2014/0201471 | A1 | 7/2014 | Cutter et al. |
| 2014/0223192 | A1 | 8/2014 | Dent et al. |
| 2014/0325013 | A1 | 10/2014 | Tamir et al. |
| 2014/0325115 | A1 | 10/2014 | Ramsundar et al. |
| 2014/0331297 | A1 | 11/2014 | Innes et al. |
| 2015/0089010 | A1 | 3/2015 | Tsirkin et al. |
| 2015/0146614 | A1 | 5/2015 | Yu et al. |
| 2015/0220429 | A1 | 8/2015 | Cypher et al. |
| 2015/0341365 | A1 | 11/2015 | Basso et al. |
| 2015/0371327 | A1 | 12/2015 | Kohari et al. |
| 2016/0036819 | A1 | 2/2016 | Zehavi et al. |
| 2016/0342510 | A1 | 11/2016 | Pani |
| 2017/0300259 | A1 | 10/2017 | Cilfone et al. |
| 2019/0087269 | A1 | 3/2019 | Gladwin et al. |

FOREIGN PATENT DOCUMENTS

| | | |
|---|---|---|
| TW | 200901724 A | 1/2009 |
| WO | WO-2010096921 A1 | 9/2010 |

OTHER PUBLICATIONS

Microsoft, "Choosing the IPSec Protocol," (Web Page), Mar. 28, 2003, 1 page, available at http://technet.microsoft.com/en-us/library/cc757847(v=ws.10).aspx.

H. Krawczyk; "HMAC: keyed-Hashing for Message Authentication"; Networking Group Request for Comments: 2104, Category: Informational; Feb. 1997, 11 pages.

International Search Report and Written Opinion received for PCT Application No. PCT/US2014/061934, dated Jul. 13, 2015, 14 pages.

Novakovic, S. et al., Scale-out NUMA, (Research Paper), Mar. 1-4, 2014, 15 Pages.

R. Rivest; "The MDS Message-Digest Algorithm"; Network Working Group Request for Comments: 1321; MIT Laboratory for Computer Science and RSA Data Security, Inc.; Apr. 1992; (20 pages).

S. Turner; "Updated Security Considerations for the MD5 Message-Digest and the HMAC-MDS Algorithms"; Internet Engineering Task Force (IETF) Request for Comments: 6151, Updates: 1321, 2104, Category: Informational, ISSN: 2070-1721; Mar. 2011; (7 pages).

Search Report and Written Opinion received for PCT Application No. PCT/US2014/063169, dated Jul. 29, 2015, 12 pages.

Shekhawat N. et al., "To Enhance the Security in Terms of Malicious Node Attacks by Using Alarm Protocol in WSN," (Research Paper), Proceedings for IIJS, Apr. 2014, vol. 2, No. 4, pp. 269-278.

Zhuang et al., "HIDE: An Infrastructure for Efficiently Protecting Information Leakage on the Address Bus", ASPLOS'04, Oct. 7-13, 2004, 13 pages.

* cited by examiner

600

Generate at least one of a transaction key (TK), a transaction integrity key (TIK), and a transaction encryption key (TEK)
610

Distribute an encrypted and signed TK, TIK, and/or TEK to a source electronic circuit and the destination electronic circuit
620

Certify the source electronic circuit and the destination circuit
630

ENCRYPTION FOR TRANSACTIONS IN A MEMORY FABRIC

BACKGROUND

Communication protocols exist to provide standard formats for exchanging messages between computers, devices, circuits, etc. In the memory domain, a memory protocol is often used to communication information between memory and a memory controller or other electronic circuits. For example, Double Data Rate (DDR) is a protocol for synchronous dynamic random-access memory (SDRAM). The DDR protocol allows data to be transferred from memory to another electronic circuit on both the rise and fall of a clock cycle. According to the DDR protocol, the data may be transferred from memory using parallel lanes of a data bus.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
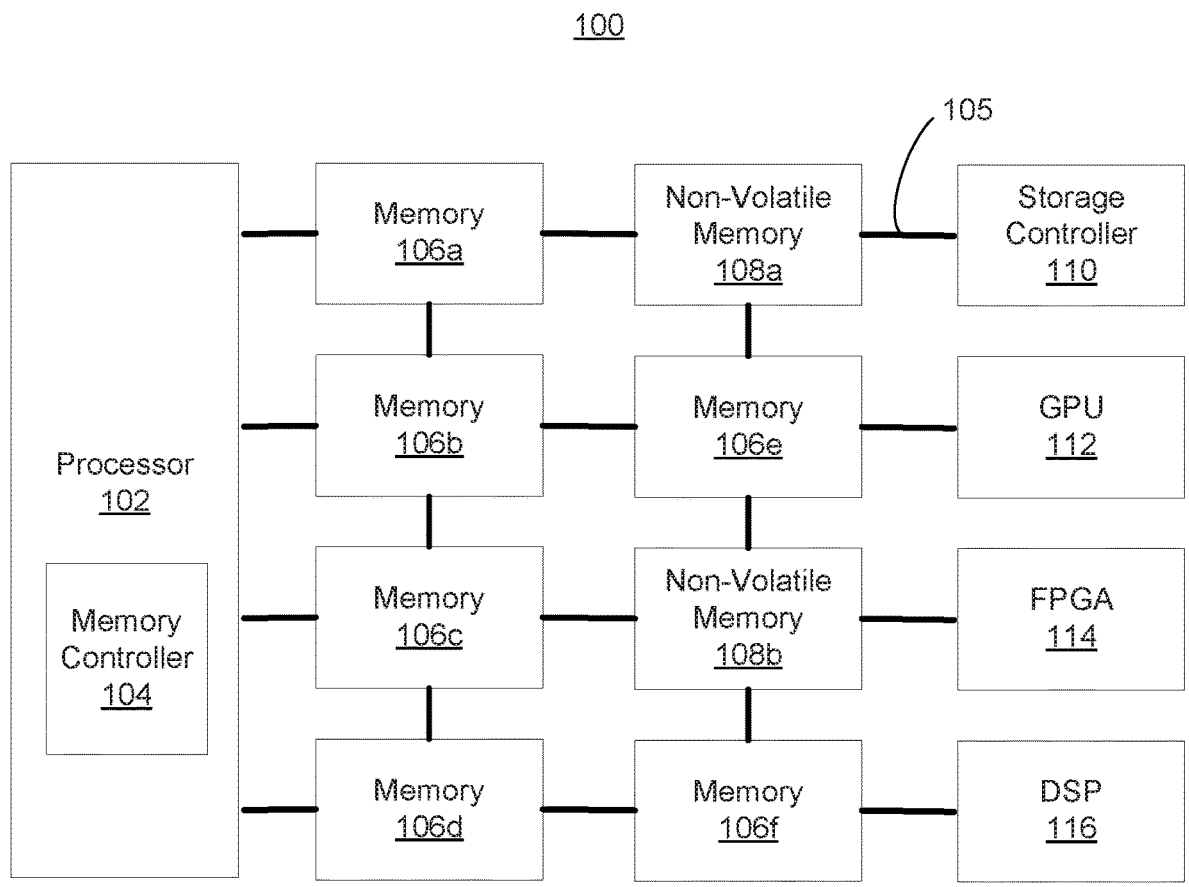
FIG. 1 shows a block diagram of a memory fabric, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are examples to facilitate memory address encryption for transactions between integrated or discrete electronic circuits of a memory fabric. In one example, the memory fabric is a physical layer topology with electronic circuits that pass data to each other through interconnecting communication channels (e.g., links). Routing on the interconnecting communication channels is performed according to a memory fabric protocol. The memory fabric may be inside of a device such as a mobile device and used to communicate information between electronic circuits inside of the device. A transaction, for instance, includes a data packet with multiple protocol fields that specify an operation and may include an optional payload for exchange between a source electronic circuit and a destination electronic circuit. The electronic circuits of the memory fabric may include processors, memory, memory controllers, input/output (I/O) controllers, storage controllers, field-programmable gate arrays (FPGAs), digital signal processors (DSPs), graphics processing units (GPUs), or any circuit in a computer system. According to the disclosed examples, the transactions may be secured using cryptographic methods for data integrity, data confidentiality, and key management. The memory fabric, as described above, may be internal to a chip or may extend chip-to-chip interconnections. A memory fabric protocol is a communication protocol specifying rules or standards for communicating in the memory fabric.

Specifically, the disclosed examples create a separation of ciphered data to prevent redundant encryptions of the same data. By way of example, a memory controller of an electronic circuit may provide both data-in-transit encryption and data integrity for a header of a transaction, while deferring data-at-rest encryption for a payload of the transaction to an end-user. Thus, generally speaking, the disclosed examples may provide data confidentiality and data integrity for transactions while eliminating redundant encryptions of payloads to decrease power consumption and heat generation in the memory fabric.

Transactions of the disclosed examples may be secured using cryptographic methods for data confidentiality, data integrity, and key management. Data confidentiality refers to placing a limit or restriction on accesses by a third-party to sensitive data in a transaction. Data integrity refers to assuring the accuracy and consistency of a transaction. That is, the transaction is protected against modification in an unauthorized or undetected manner by a third party. Key management refers to the distribution of keys to electronic circuits in the memory fabric. Data-at-rest refers to inactive data that is stored physically in a digital form (e.g., databases, data warehouses, spreadsheets, archives, tapes, offsite backups, mobile devices etc.). Data-in-use refers to active data that is stored in a non-persistent digital state (e.g., in computer random access memory (RAM), computer processing unit (CPU) caches, or CPU registers).

According to an example of the present disclosure, memory address confidentiality and data integrity may be provided to a transaction between electronic circuits of a memory fabric. In this example, an electronic circuit in the memory fabric may obtain a transaction integrity key and a transaction encryption key. The transaction integrity key and the transaction encryption key are data that can be used to produce a cipher. A truncated key-hashed message authentication code (HMAC) (e.g., 64-bit) may be computed by the electronic circuit using the transaction integrity key. A hash function, for instance, may be implemented on a concatenation of an address value (e.g., 64-bit) and a payload of the transaction. The electronic circuit may then encrypt a concatenation of the address value and the truncated HMAC using the transaction encryption key to determine a ciphertext (e.g., 128-bit). The ciphertext may be split into an encrypted address (e.g., 64-bit) and an encrypted HMAC (e.g., 64-bit). In this regard, an address field of the transaction may be replaced with the encrypted address and the encrypted HMAC may be placed in a next header field of the transaction according to a memory fabric protocol of the disclosed examples.

According to another example of the present disclosure, data pattern analysis protection may be provided in addition to memory address confidentiality and data integrity for the transaction. That is, data patterns in the ciphertext may be obscured to prevent a third-party from discerning the ciphertext. In this example, an electronic circuit in the memory fabric may obtain a transaction integrity key and a transaction encryption key. The electronic circuit may encrypt a counter value (e.g., 128-bit) from the transaction using the transaction encryption key and then truncate the encrypted counter value (e.g., 64-bit). An exclusive-or operation may be applied to the truncated encrypted counter value and an address value (e.g., 64-bit) from the transaction to compute an address ciphertext (e.g., 64-bit). The address ciphertext may then be used as an input to a key-hashed message authentication code (HMAC) function or a message authentication code (MAC) function. For example, a truncated MAC or HMAC (e.g., 64-bit) may be computed using the transaction integrity key on a concatenation of the address ciphertext and a payload of the transaction. The truncated MAC or HMAC (e.g., 64-bit), for example, may be computed by applying the transaction integrity key and the concatenation of the address ciphertext and the payload as inputs to an HMAC or MAC function. In an example, standard MAC or HMAC functions may be used. RFC 2104 is a standard promulgated by the Internet Engineering Task Force (IETF) describing an HMAC function that may be used. An address field of the transaction may be replaced with the address ciphertext and the truncated MAC may be placed in a next header field of the transaction according to a memory fabric protocol of the disclosed examples.

The examples disclosed herein may be implemented according to a scalable and extensible memory fabric protocol that interconnects numerous electronic circuits at high data transfer rates. The disclosed memory fabric protocol operates on physical layer communications and does not operate on layer 3 of the Open Systems Interconnection (OSI) protocol stack (e.g., Transmission Control Protocol (TCP)/Internet Protocol (IP); TCP/IP). For example, the disclosed memory fabric protocol may include an abstract physical layer interface to support multiple physical layers, thus allowing the disclosed memory fabric protocol to be tailored to market needs independent of devices (e.g., network interface controller (NIC)) or operating systems.

The disclosed memory fabric protocol may be a serial protocol to provide high-bandwidth in the communication channels of the memory fabric and enhance the scalability of the electronic circuits of the memory fabric. In other words, the serial memory fabric protocol may provide scalability of bandwidth, as it is easier to add more communication channels to scale the bandwidth.

The improved scalability and extensibility of the disclosed memory fabric protocol, however, may expose an electronic circuit to malicious or compromised electronic circuits in the distributed memory fabric. Accordingly, examples of the present disclosure use cryptography to safeguard the integrity and confidentiality of transactions between electronic circuits. In particular, the disclosed examples provide cryptographic security for a high-performance, scalable and extensible memory fabric protocol with small minimum-size packets.

That is, the disclosed examples provide authentication and access control in a memory fabric protocol where minimal overhead space (e.g., 8 bytes) is allotted for security of transmissions.

In contrast to the disclosed memory fabric protocol, software layer security protocols, such as TCP/IP security, operate over slower network technologies and tolerate more latency, more cost, more overhead and more complexity. For example, the minimum overhead for a Transport Layer Security/Secure Sockets Layer (TLS/SSL) packet is 90 bytes per packet, which is about a 6% overhead, given 1500 byte packets. According to an example, the minimum size of a packet for the disclosed memory fabric protocol may be as low as 24 bytes. Accordingly, minimal bytes may be allocated in the packet for security. As a result, the disclosed memory fabric protocol provides lower-overhead and lower-cost to maximize the scalability and extensibility of electronic circuits.

With reference to FIG. 1, there is shown a block diagram of a memory fabric 100, according to an example of the present disclosure. It should be understood that the memory fabric 100 may include additional components and that one or more of the components described herein may be removed and/or modified without departing from a scope of the memory fabric 100.

The memory fabric 100 is depicted by way of example as including electronic circuits such as a processor 102, a memory controller 104, volatile memory 106*a-f*, non-volatile memory 108*a-b*, a storage controller 110, a graphical processor unit (GPU) 112, a field-programmable gate array (FPGA) 114, and a digital signal processor (DSP) 116. Each electronic circuit may include one or more physical interfaces to communicate with another physical interface via a link 105 (i.e., communication channel) between two electronic circuits.

According to an example, a link 105 may include at least one transmitter lane and one receiver lane and may be either symmetric or asymmetric. A link includes a physical medium for transmitting signals. A symmetric link is a link where the number of transmitter lanes is equal to the number of receiver lanes. Conversely, an asymmetric link is a link where the number of transmitter lanes is not equal to the number of receiver lanes. Depending upon the underlying physical layer capabilities, the number of transmitter and receiver lanes may be statically provisioned or dynamically adjusted on a per-link basis. Additional capacity and performance scaling can be achieved through the use of integrated or discrete switches. As a result, a variety of topologies may be constructed from simple daisy chains to star to 3D-Torus to increase aggregate performance and optionally improve resiliency of the memory fabric.

The processor 102, which may be a microprocessor, a micro-controller, an application specific integrated circuit (ASIC), or the like, is to perform various processing functions in the memory fabric 100. For example, the processor may perform the function of securing transactions between the electronic circuits of a memory fabric 100. The memory controller 104 is an electronic circuit that manages the flow of data (e.g., high-level transactions such as reads, writes, etc.) going to and from the memory 106*a-f*. The memory controller 104 may be a separate electronic circuit or may be integrated into the die of the processor 102. The memory 106*a-f* may include static RAM (SRAM), dynamic RAM (DRAM), or the like. Moreover, each of the memory 106*a-f* may include a separate media controller to service the high-level transactions and perform media-specific services and management.

The processor 102, memory controller 104, and memory 106*a-f* may be coupled by links to the non-volatile memory 108*a-b*, the storage controller 110, the GPU 112, the FPGA 114, and the DSP 116. The non-volatile memory 108*a-b* may include read-only memory (ROM), flash memory, magnetic computer storage devices, and the like. The storage controller 110, for instance, may communicate with a hard disk or disk drive. The GPU 112 may manipulate and alter memory 106*a-f* to accelerate the creation of images in a frame buffer intended for output to a display. The FPGA 114, for example, is an electronic circuit that may be programmed after manufacturing. Lastly, the DSP 116 may be used to measure, filter and/or compress continuous real-world analog signals. These electronic circuits (e.g., the non-volatile memory 108*a-b*, the GPU 112, the FPGA 114, and the DSP 116) may access the memory 106*a-f* through the memory controller 104 of the memory fabric 100.

As noted above, the protocol for the memory fabric 100 may be optimized to support memory semantic communications using a scalable packetized transport with scalable and power-proportional link, physical layers, and underlying memory media access. That is, each market segment may require one or more market-specific physical layers to be supported. According to an example, the memory fabric protocol includes an abstract physical layer interface to support multiple physical layers and media. As a result, the physical layers may evolve or be replaced without disrupting or waiting for the entire ecosystem to move in lock-step. The abstract physical layer may include the media access control sublayer, physical coding sublayer, and physical medium attachment sublayer. The electronic circuits of the memory fabric 100 may implement the abstract physical layer to facilitate interoperable communications.

Figure 2:
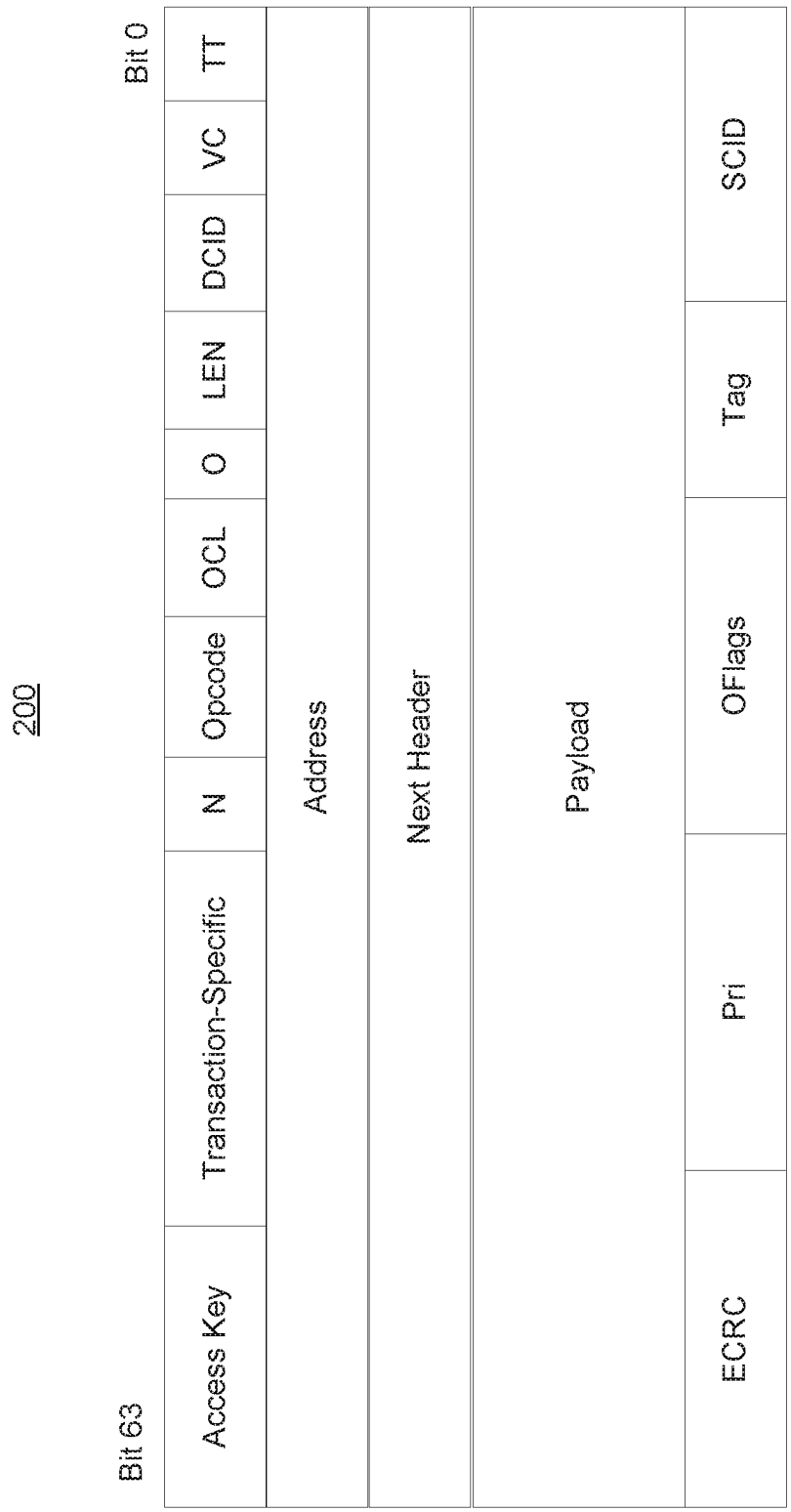
FIG. 2 shows a packet of a memory fabric protocol, according to an example of the present disclosure.

With reference to FIG. 2, there is shown an example of a packet 200 of the memory fabric protocol of the present disclosure. The packet 200, for instance, may include a Next Header field that carries security information (e.g., SMH) to enable electronic circuits of the memory fabric to authenticate that a transaction was transmitted by an authorized source and was not tampered with during transit.

It should be understood that the packet 200 may include additional protocol fields and that one or more of the protocol fields described herein may be removed and/or modified without departing from a scope of the packet 200. The packet 200 is depicted as including the protocol fields shown in TABLE 1 below.

TABLE 1

| Field Name | Size (Bits) | Description |
| --- | --- | --- |
| Access Keys | Variable (e.g., 16) | Indicates restricted or unrestricted access to targeted resources. |
| Transaction-Specific | Variable | May have different meanings for different transactions. |
| Next Header Present (N) | 1 | Indicates if a 64-bit next header field follows the initial 64-bits of protocol header. |
| Operation Code (OpCode) | 5 | Indicates an operation type as well as an operation payload size (if present). |
| OpClass (OCL) | Variable (e.g., 4) | Indicates an operation class. |
| OpClass Present (O) | 1 | Indicates whether the OCL field is present. The presence of the OCL may indicate the presence of the access key field presence. |
| Length (Len) | 6 | Indicates the encoded transaction length in 64-bit multiples. |
| Destination Component Identifier (DCID) | 11 | Identifies a destination electronic circuit. |
| Virtual Channel (VC) | 3 | Identifies a virtual channel for the transaction. |
| Transaction Type (TT) | 2 | Indicates the type of the transaction (e.g., link-local, unicast end-to-end transaction, multicast end-to-end, etc.). |
| Address | 64 | Indicates a unique identifier to access or target an electronic circuit's resources (e.g., memory). |
| Payload | Variable | Transaction-specific payload. |
| End-to-End Cyclic Redundancy Check (ECRC) | 24 | Data Integrity Field |
| Priority (Pri) | 3 | Differentiates transaction processing within the receiving electronic circuit by, for instance, determining the transaction execution order. |
| Operation Flags (OFlags) | 6 | Various operation flags. |
| Tag | 20 | Associates a request with a response or acknowledgement. |
| Source Component Identifier (SCID) | 11 | Identifies a source electronic circuit. |

According to an example, the Next Header field may be included in the packet 200 to allow multiple semantics to be attached based on solution needs. For instance, the Next Header may be a security message header (SMH) that includes a 64-bit HMAC. In this example, the Next Header enables electronic circuits to authenticate that the transaction was transmitted by an authorized source and was not tampered with during transit. The presence of the Next Header does not impact transaction relay and if an electronic circuit does not support the configured meaning, the Next Header may be ignored upon receipt. That is, the electronic circuit may locate the subsequent payload or protocol fields even if it does not support the Next Header.

Figure 3:
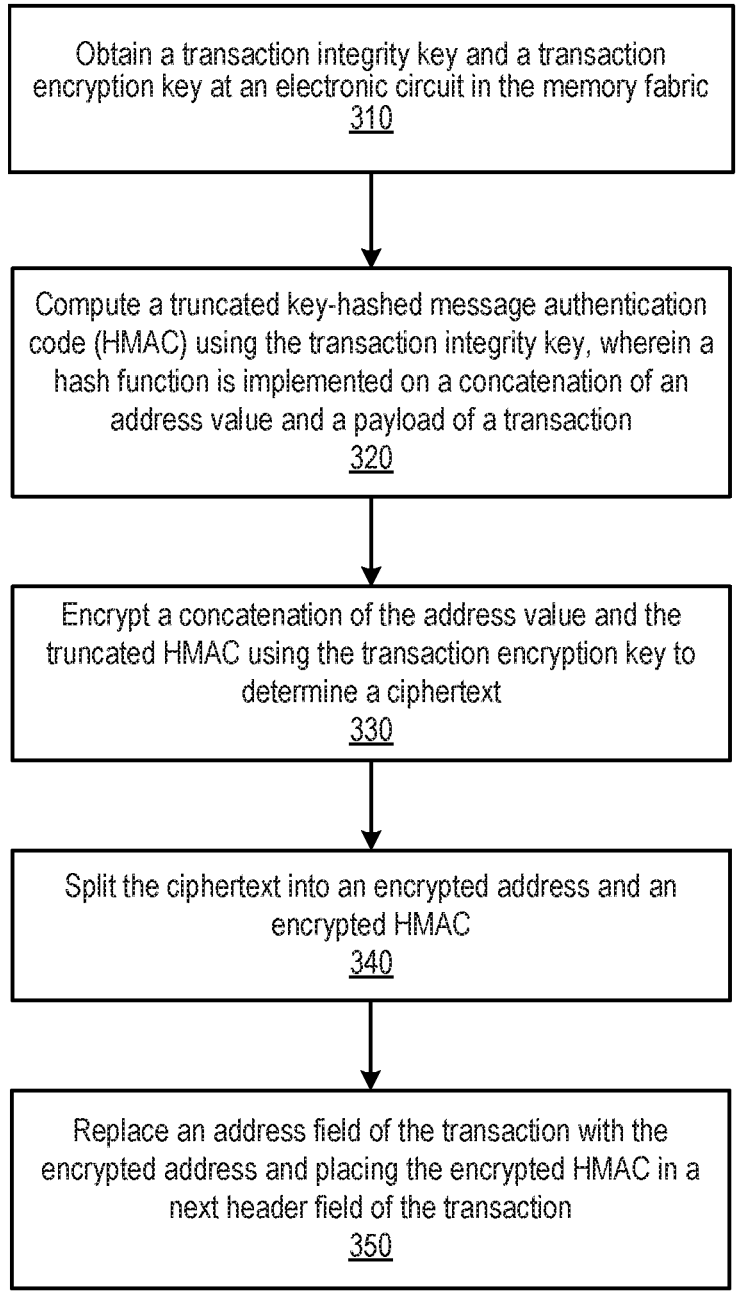
FIG. 3 shows a flow chart of a method to facilitate memory address encryption for transactions, according to an example of the present disclosure.

With reference to FIG. 3, there is shown a flow chart of a method 300 to facilitate memory address encryption for transactions according to a memory fabric protocol of an example of the present disclosure. The method 300 may be implemented, for example, by one of the electronic circuits depicted in FIG. 1.

At block 310, an electronic circuit in the memory fabric may obtain a transaction integrity key (TIK) and a transaction encryption key (TEK). According to one example, the TIK and TEK may be received from a key distribution server as further discussed below with reference to FIGS. 5 and 6. According to another example, the TIK and TEK may be provided by to the electronic circuit during manufacture.

At block 320, the electronic circuit may compute a truncated message authentication code (MAC), such as a key-hashed message authentication code (HMAC), using the TIK. According to an example, a hash function may be applied to a concatenation of an address value (addr) and a payload of a transaction (e.g., HMAC(TIK, addr+payload)). The HMAC may then be truncated to fit the 64-bits allocated to the Next Header field of the transaction according to the disclosed memory fabric protocol.

At block 330, the electronic circuit may then encrypt a concatenation of the address value (e.g., 64-bits) and the truncated HMAC (e.g., 64-bits) using the TEK to determine a ciphertext (e.g., 128-bit). According to an example, the plaintext of the address value and the truncated HMAC may be encrypted using an electronic codebook (ECB) encryption mode since the address value and the truncated HMAC may both be 64-bits each (e.g., addr+HMAC=ECB_encrypt (TEK, addr+HMAC)).

At block 340, the ciphertext (e.g., 128-bit) may be split into an encrypted address (e.g., 64-bit) and an encrypted HMAC (e.g., 64-bit). In this regard, for example, an address field of the transaction may be replaced with the encrypted address and the encrypted HMAC may be placed in the Next Header field of the transaction, as shown in block 350.

According to an example, the electronic circuit may also decrypt and verify an HMAC of a received transaction. For instance, the electronic circuit may receive a transaction from another electronic circuit in the memory fabric and decrypt a concatenation of the encrypted address and the encrypted HMAC using the TIK (e.g., addr HMAC=ECB_decrypt(TEK, addr+HMAC)). The electronic circuit may then, for example, verify the integrity of the decrypted HMAC using the TIK.

Figure 4:
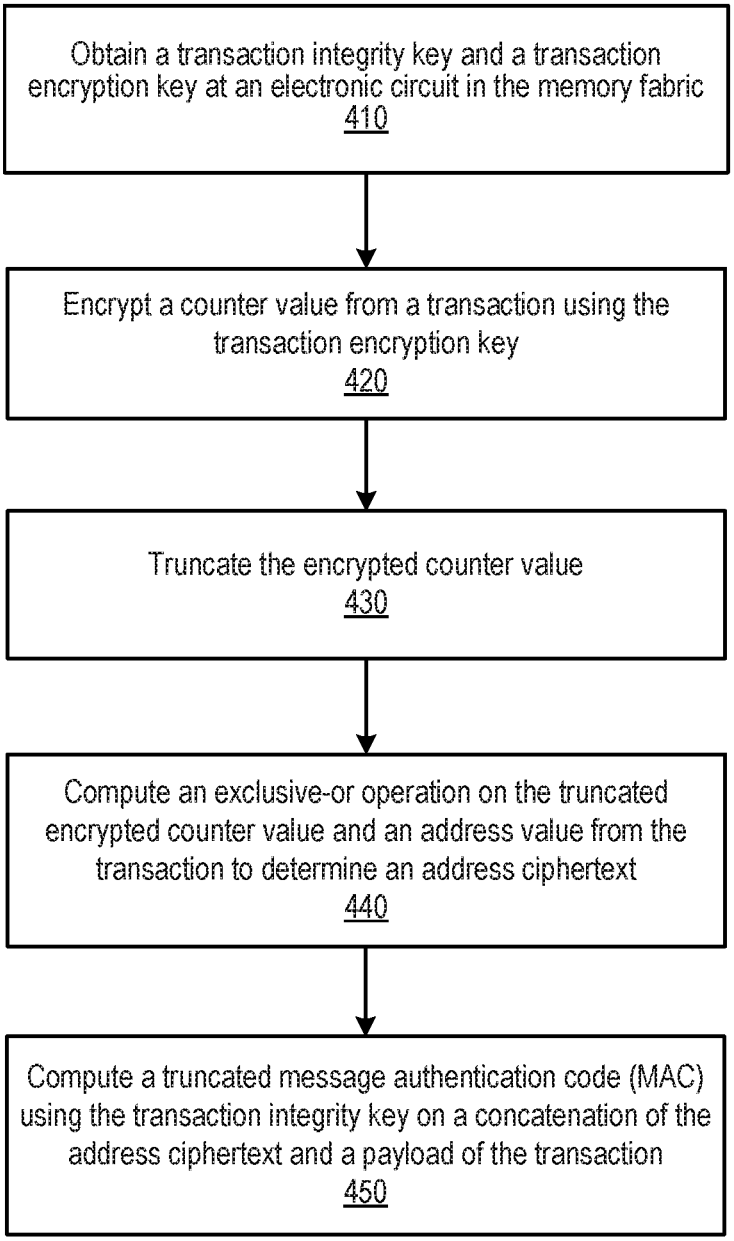
FIG. 4 shows a flow chart of a method to facilitate pattern analysis protection and memory address encryption for transactions; according to an example of the present disclosure.

With reference to FIG. 4, there is shown a flow chart of a method 400 to facilitate pattern analysis protection and memory address encryption for transactions according to a memory fabric protocol of an example of the present disclosure. That is, the method 400 may further obscure data patterns in the ciphertext to prevent a third-party from discerning the ciphertext. The method 400 may be implemented, for example, by one of the electronic circuits depicted in FIG. 1.

At block 410, an electronic circuit in the memory fabric may obtain a transaction integrity key (TIK) and a transaction encryption key (TEK). According to an example, the TIK and TEK may be received from a key distribution server as further discussed below with reference to FIGS. 5 and 6. According to another example, the TIK and TEK may be provided by to the electronic circuit during manufacture.

In block 420, the electronic circuit may encrypt a counter value from a transaction using the TEK. The counter value may be taken from a field in the transaction, which may be a packet field. The counter value, for instance, may be 128-bits and may be included in a tag field in a footer of the transaction. Alternatively, a random number (e.g., nonce) may be encrypted using the TEK. The encrypted counter value or random number may then be truncated to the first 64-bits from the 128-bits for example, as shown in block 430.

At block 440, the electronic circuit may compute an exclusive-or operation on the truncated encrypted counter value and a 64-bit address value (addr) from the transaction to determine an address ciphertext. The address ciphertext, for instance, may be 64-bits in length. According to an example, a counter (CTR) mode of encryption may be used to determine the address ciphertext (addr_ciph) of the transaction (e.g., addr_ciph=CTR_encrypt(TEK, counter, addr)= CTR_encrypt(TEK, counter) XOR addr).

At block 450, the electronic circuit may compute a truncated message authentication code (MAC) using the TIK on a concatenation of the address ciphertext and a payload of the transaction. According to an example, the truncated MAC may be 64-bits and may be a keyed-hash message authentication code (HMAC) (e.g, HMAC(TIK, ciph_addr+payload). As a result, therefore, an address field of the transaction may be replaced with the address ciphertext and the truncated MAC or HMAC may be placed in the Next Header field of the transaction.

According to an example, the electronic circuit may also decrypt and verify a MAC or HMAC of a received transaction. For instance, the electronic circuit may receive a transaction from another electronic circuit in the memory fabric and verifying a MAC or HMAC of the received transaction using the TIK. The electronic circuit may then encrypt a counter value (or an encrypted nonce) of the received transaction using the TEK and compute an exclusive-or operation on the encrypted counter value and an address ciphertext to determine the address value for the received transaction (e.g., addr=CTR_encrypt(TEK, counter, addr_cipher)=decrypt(TEK, counter) XOR addr_cipher).

Figure 5:
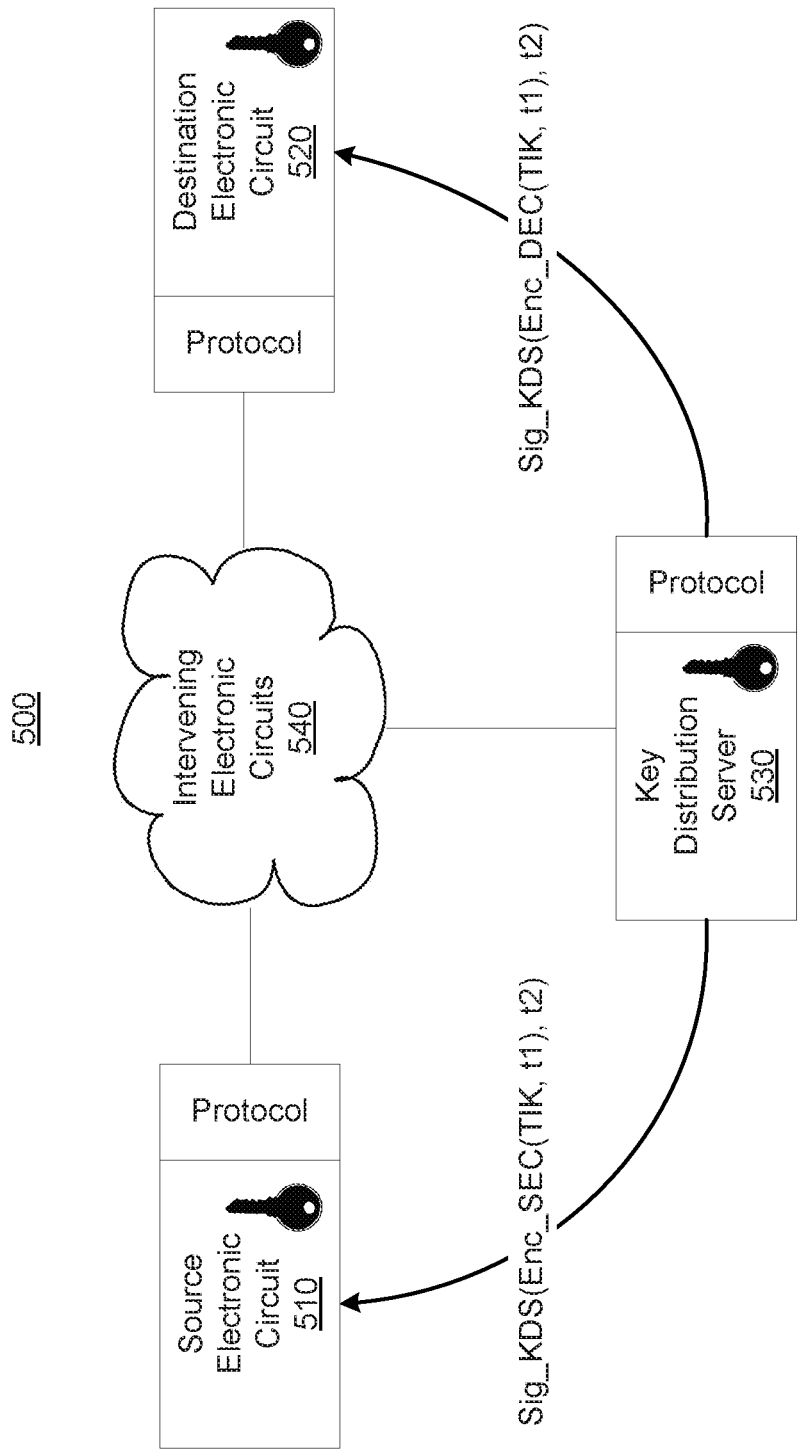
FIG. 5 shows a flow chart of a key management system, according to an example of the present disclosure.

FIG. 5 shows a block diagram of a key management system 500, according to an example of the present disclosure. The key management system 500 according to the memory fabric protocol may include a source electronic circuit 510, a destination electronic circuit 520, a key distribution server 530, and intervening electronic circuits 540.

According to an example, cryptographic keys are managed by a centralized third-party key distribution server 530. Each electrical circuit in the memory fabric 100 (source electronic circuit 510, destination electronic circuit 520, and key distribution server 530) may have a unique identifier and a public/private key pair. The public/private key pair, for example, may be generated during manufacture of the respective electronic circuits. A key may be cryptographically bound with the unique identifier. For example, the public key may directly serve as the identifier for the respective electronic circuit.

An electrical circuit in the memory fabric 100 may be assigned to be the key distribution server 530. Each transaction according to the memory fabric protocol may include the source electronic circuit 510, intervening electronic circuits 540, and a destination electronic circuit 520 (or multiple destination electronic circuits). Accordingly, during the operation of the memory fabric protocol, if the source electronic circuit 510 and the destination electronic circuit 520 have not yet established a shared TIK, the key distribution server by 530 may distribute the TIK to the source electronic circuit 510 and the destination electronic circuit 520 using the key management method described below in FIG. 6.

According to an example, an asymmetric key belonging to the source electronic circuit 510 or the destination electronic circuit 520 may be an encryption/decryption key pair, and the asymmetric key belonging to a key distribution server 530 may be a digital signature/signature verification key pair. The key distribution server 530 may have an authentic copy of both the source electronic circuits public key and destination electronic circuits public key. Additionally, both the source electronic circuit 510 and the destination electronic circuit 530 may have an authentic copy of the key distribution server's public key. According to an example, a key certification service may provide authentic copies of the public keys to the respective electronic circuits as discussed above. Alternatively, during a first computer boot sequence, each electronic circuit may register their identifier and public key with the key distribution server 530 assuming that the communication channel between the key distribution server 530 and the source electronic circuit 510 or destination electronic circuit 520 is safe.

Figure 6:
FIG. 6 shows a flow chart of a method to distribute keys to electronic circuits according to a memory fabric protocol of an example of the present disclosure.
Figure 6:

With reference to FIG. 6, there is shown a flow chart of a method 600 to distribute keys to electronic circuits according to a memory fabric protocol of example of the present disclosure. The method 600 may be implemented, for example, by one of the electronic circuits depicted in FIG. 1. The method 600 allows the key distribution server 530 to generate and distribute a TK to the source electronic circuit 510 and to one or more destination electronic circuits.

At block 610, the key distribution server 530 may generate a TK, TIK and/or TEK from scratch. Alternatively, the key distribution server 530 may derive a TIK and a TEK from a TK using a master key with a key derivation function (KDF).

At block 620, the key distribution server 530 may distribute the TK, TIK, and/or the TEK to the source electronic circuit 510 and destination electronic circuit 520 using a combined encryption and signature algorithm. For example, the key distribution server (KDS) 530 may encrypt a plaintext under the receiver's public key (e.g., source electronic circuit (SEC) 510 or the destination electronic circuit (DEC) 520) and sign the ciphertext under the key distribution server's private key.

Accordingly, the key distribution server 530 may then transmit the encrypted and signed TIK to the source electronic circuit 510 (e.g., sig_KDS(encSEC(TK, t1), t2)) and to the destination electronic circuit 520 (e.g., sig_KDS(enc_DEC(TK, t1), t2), where t1 and t2 denote optional tests such as a time value, sequence value or nonce, which may be used against replay attacks.

Thus, the source electronic circuit 510 or the destination electronic circuit 520 may receive the encrypted and signed TK, TIK, and/or TEK from the key distribution server 530. If the source electronic circuit 510 or the destination electronic circuit 520 receives a TK, the source electronic circuit 510 or the destination electronic circuit 520 may derive a TIK and TEK from the TK using a key derivation function (e.g., TIK=KDF(TK, "Integrity") and TEK=KDF(TK, "Encryption"), where "Integrity" and "Encryption" represent distinct salt values). In order to maintain the security level for encryption and MAC using the derived keys, the TK should have sufficient entropy. For example, the length of TK may be longer than the length of max (TIK, TEK). The source electronic circuit 510 or the destination electronic circuit 520 may then verify the integrity of the received TK, TIK, and/or TEK using an authentic copy of a public digital verification key of the key distribution server 530, and decrypt the received TK, TIK, and/or TEK using a private decryption key of the respective electronic circuit.

At block 630, the key distribution server 530 may certify the source electronic circuit 510 and destination electronic circuit 520. According to an example, the key distribution server 530 may introduce the source electronic circuit 510 and destination electronic circuit 520 by including their identifiers along with the distributed TIK. For instance, the key distribution server may transmit the TK to the source electronic circuit 510 as sig_KDS(enc_SEC(DEC, TK, t1), t2) and to the destination electronic circuit 520 as sig_KDS(enc_DEC(SEC, TK, t1), t2).

While FIGS. 5 and 6 show key management and subsequent communication between a pair of electronic circuits, the method 600 may be used for a larger number of communicating peers. In the case in which the source electronic circuit 510 communicates with multiple destination electronic circuits, the source electronic circuit 510 and the multiple destination electronic circuits may belong to a group that all share the same TIK. Alternatively, the source electronic circuit 510 and the multiple destination electronic circuits may be partitioned into several subgroups, each of the subgroups sharing a single TIK.

Some or all of the operations set forth in the methods 300, 400, and 600 may be contained as utilities, programs, or subprograms, in any desired computer accessible medium. In addition, the methods 300, 400, and 600 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include conventional computer system RAM, ROM, EPROM, EEPROM, and magnetic or optical disks or tapes. It is therefore to be understood that any electronic device capable of executing the above-described functions may perform those functions enumerated above.

Figure 7:
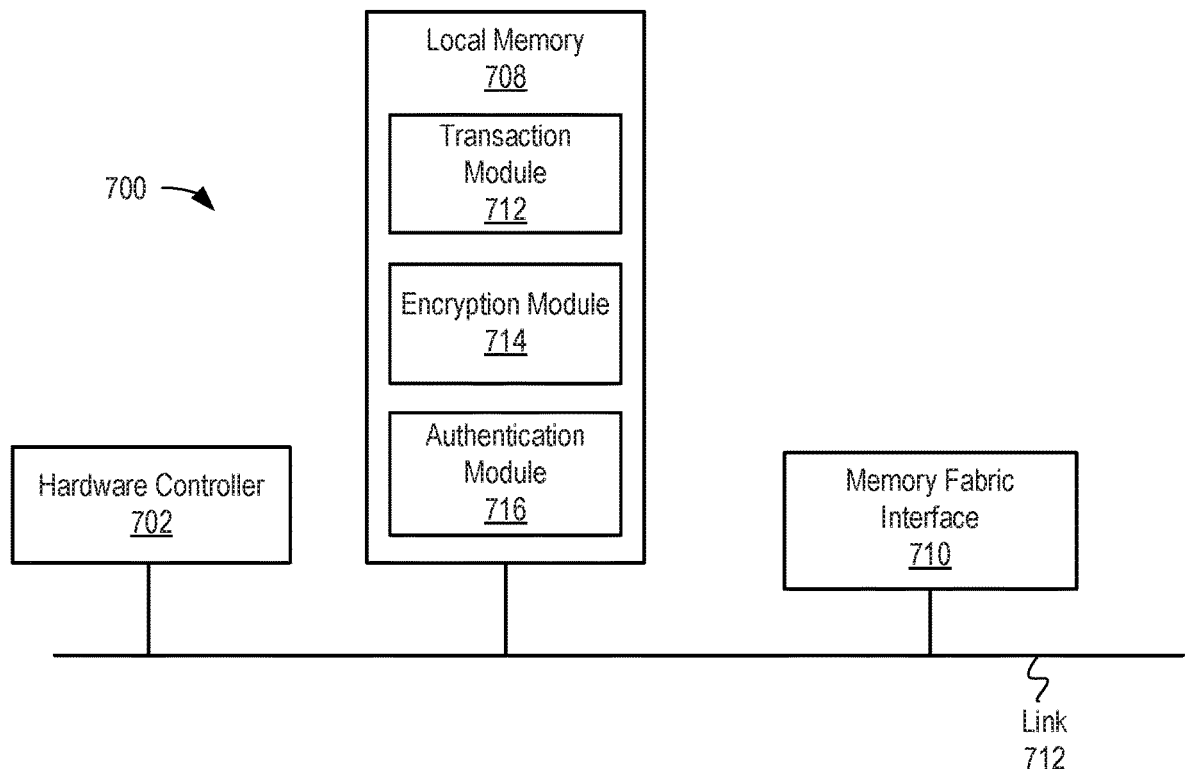
FIG. 7 shows a schematic representation of an electronic circuit that is connectable to a memory fabric, according to an example of the present disclosure.

Turning now to FIG. 7, a schematic representation of an electronic circuit 700 of the memory fabric is shown according to an example of the present disclosure. Examples of the electronic circuit 700 may include a central processor, memory controller, GPU, etc. that can send and receive secure transactions in the memory fabric shown in FIG. 1. The electronic circuit 700 may be employed to perform various functions of methods 300, 400, and 600 as depicted in FIGS. 3, 4 and 6 according to an example implementation. The electronic circuit 700 may include a hardware controller 702, a local memory 708, and a memory fabric interface 710. Each of these components may be operatively coupled to a link 712.

The local memory 708 may be a computer readable medium that stores machine readable instructions which are executable by the hardware controller 702 to perform the various functions of methods 300, 400, and 600 as depicted in FIGS. 3, 4 and 6. For example, the local memory 708 may store a transaction module 712 that is executable by the hardware controller 702 to obtain a transaction integrity key and a transaction encryption key. The local memory 708 may also store an encryption module 714 that is executable by the hardware controller 702 to encrypt an arbitrary number using the transaction encryption key, wherein the encrypted arbitrary number is truncated in length, and to calculate an exclusive-or operation on the encrypted arbitrary number and an address value from the transaction to determine an address ciphertext. Further, the local memory 708 may store an authentication module 716 that is executable by the hardware controller 702 to calculate a truncated keyed-hash message authentication code (HMAC) using the transaction integrity key on a concatenation of the address ciphertext and a payload of the transaction. The transaction may be transmitted via the memory fabric interface 710, which connects the electronic circuit 700 to a memory fabric.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method to facilitate memory address encryption for transactions between electronic circuits in a memory fabric, comprising:
   obtaining, at an electronic circuit in the memory fabric, a transaction integrity key and a transaction encryption key;
   encrypting a counter value from a transaction using the transaction encryption key;
   truncating the encrypted counter value;
   computing an exclusive-or operation on the truncated encrypted counter value and an address value from the transaction to determine an address ciphertext; and
   computing a truncated message authentication code (MAC) using the transaction integrity key on a concatenation of the address ciphertext and a payload of the transaction.

2. The method of claim 1, comprising:
   replacing an address field of the transaction with the address ciphertext; and
   placing the truncated MAC in a next header field of the transaction.

3. The method of claim 1, wherein the counter value is 128-bit and the truncated encrypted counter value is a first 64-bits of the encrypted counter value.

4. The method of claim 1, wherein the address value is 64-bits and the truncated MAC is 64-bits.

5. The method of claim 1, wherein the truncated MAC is keyed-hash message authentication code (HMAC).

6. The method of claim 1, comprising:
   receiving a transaction from another electronic circuit in the memory fabric;
   verifying a MAC of the received transaction using the transaction integrity key;
   encrypting a counter value of the received transaction using the transaction encryption key; and
   computing an exclusive-or operation on the encrypted counter value and an address ciphertext to determine the address value for the received transaction.

7. The method of claim 1, wherein obtaining the transaction integrity key and the transaction encryption key comprises receiving the transaction integrity key and the transaction encryption key from a key distribution server in the memory fabric.

8. A method to facilitate memory address encryption for transactions between electronic circuits in a memory fabric, comprising:
   obtaining, at an electronic circuit in the memory fabric, a transaction integrity key and a transaction encryption key;
   computing a truncated message authentication code (MAC) using the transaction integrity key, wherein a hash function is applied to a concatenation of an address value and a payload of a transaction;
   encrypting a concatenation of the address value and the truncated MAC using the transaction encryption key to determine a ciphertext;
   splitting the ciphertext into an encrypted address and an encrypted MAC; and
   placing the encrypted address in an address field of the transaction and the encrypted MAC in a next header field of the transaction.

9. The method of claim 8, wherein to compute a truncated MAC, wherein computing the truncated MAC comprises computing a 64-bit key-hashed message authentication code (HMAC).

10. The method of claim 8, wherein splitting the ciphertext comprises splitting the ciphertext into a 64-bit encrypted address and a 64-bit encrypted MAC.

11. The method of claim 8, comprising:
    receiving a transaction from another electronic circuit in the memory fabric;
    decrypting a concatenation of the encrypted address and the encrypted MAC using the transaction encryption key; and
    verify the integrity of the decrypted MAC using the transaction integrity key.

12. An electronic circuit connectable to a memory fabric, the electronic circuit comprising:
    a hardware controller; and
    a local memory storing machine readable instructions, executable by the hardware controller, that cause the hardware controller to:
      obtain a transaction integrity key and a transaction encryption key;
      encrypt an arbitrary number using the transaction encryption key, wherein the encrypted arbitrary number is truncated in length, and calculate an exclusive-or operation on the encrypted arbitrary number and an address value from the transaction to determine an address ciphertext; and
      calculate a truncated keyed-hash message authentication code (HMAC) using the transaction integrity key on a concatenation of the address ciphertext and a payload of the transaction.

13. The electronic circuit of claim 12, comprising machine readable instructions that are executable by the hardware controller to:
    replace an address field of the transaction with the address ciphertext; and
    place the truncated HMAC in a next header field of the transaction.

14. The electronic circuit of claim 12, comprising machine readable instructions that are executable by the hardware controller to:
    receive a transaction from another electronic circuit in the memory fabric;
    verify a HMAC of the received transaction using the transaction integrity key;
    encrypt an arbitrary number of the received transaction using the transaction encryption key; and
    compute an exclusive-or operation on the encrypted arbitrary number and an address ciphertext to determine the address value for the received transaction.

15. The electronic circuit of claim 12, wherein to obtain the transaction integrity key and the transaction encryption key, the machine readable instructions are executable by the hardware controller to obtain the transaction integrity key and the transaction encryption key from a key distribution server in the memory fabric.

16. The method of claim 1, wherein communication in the memory fabric is implemented according to a memory fabric protocol that operates on a physical layer of a protocol stack.

17. The method of claim 1, wherein the electronic circuits in the memory fabric are provided inside a device and are connected via links which are internal to a chip or chip-to-chip interconnections in the device.

* * * * *